(12) United States Patent
Schmitz et al.

(10) Patent No.: US 9,548,889 B2
(45) Date of Patent: Jan. 17, 2017

(54) METHODS AND APPARATUSES FOR AUTOMATED TDM-ETHERNET PROVISIONING

(71) Applicant: Enginuity Communications Corporation, St. Charles, IL (US)

(72) Inventors: Peter Bradley Schmitz, Fairfax Station, VA (US); Natalie C. Ramsay, Herndon, VA (US)

(73) Assignee: Enginuity Communications Corporation, St. Charles, IL (US)

( * ) Notice: Subject to any disclaimer, the term of this patent is extended or adjusted under 35 U.S.C. 154(b) by 127 days.

(21) Appl. No.: 14/203,717

(22) Filed: Mar. 11, 2014

(65) Prior Publication Data

US 2014/0269420 A1    Sep. 18, 2014

Related U.S. Application Data

(60) Provisional application No. 61/790,819, filed on Mar. 15, 2013.

(51) Int. Cl.
*H04L 12/24* (2006.01)
*H04L 12/26* (2006.01)
*H04L 29/12* (2006.01)

(52) U.S. Cl.
CPC ......... *H04L 41/0803* (2013.01); *H04L 43/103* (2013.01); *H04L 61/103* (2013.01); *H04L 61/2007* (2013.01); *H04L 61/2038* (2013.01)

(58) Field of Classification Search
None
See application file for complete search history.

(56) References Cited

U.S. PATENT DOCUMENTS 6,728,238 B1   4/2004   Long et al.
7,417,950 B2   8/2008   Hofmeister et al.
(Continued)

OTHER PUBLICATIONS

Loop-V 4200-28 Series Integrated Multiservice Access Platform—OC3/STM Access, DS3 Access, CSU/DSU, E1/T1 Converter, & DACS; Data Comm for Business, Inc., 5 pages, http://www.dcbnet.com/datasheet/loop4200-28.html, printed Oct. 17, 2012.
(Continued)

*Primary Examiner* — Edan Orgad
*Assistant Examiner* — Saumit Shah
(74) *Attorney, Agent, or Firm* — Dickinson Wright PLLC (57) ABSTRACT

Apparatuses and methods assist telcos and service providers with Ethernet virtual circuit (EVC) set up. They need only set up ends of a path with a pair of units with automated private addressing, and designate one unit as a remote terminal (RT) and the other unit as a central office (CO) to ensure different addresses. After a DS1 state is enabled, no other operator involvement is needed to set up a DS1 end to end connection with the other unit since the enable DS1 state triggers automated connection set up functions such as creating/saving Default Parameters based on CO versus RT selection, creating Emulated Circuits based on saved parameters, and enabling/disabling Emulated Circuits based on DS1 Service State. Automated provisioning operations for EVC set up can be configured for other types of time division multiplexing (TDM) payloads such as other digital signaling levels, and other circuit channel types.

12 Claims, 6 Drawing Sheets

(56) References Cited

U.S. PATENT DOCUMENTS

| | | |
|---|---|---|
| 7,430,166 B2 | 9/2008 | Colven |
| 7,447,214 B2 | 11/2008 | Green |
| 7,532,630 B2 | 5/2009 | Ould-Brahim |
| 7,773,555 B1 | 8/2010 | Johnson |
| 7,782,841 B2 | 8/2010 | Rampal et al. |
| 7,821,929 B2 | 10/2010 | DelRegno et al. |
| 7,852,880 B2 | 12/2010 | Solomon et al. |
| 7,869,450 B2 | 1/2011 | DelRegno et al. |
| 8,014,316 B2 | 9/2011 | Waggener et al. |
| 8,144,575 B2 | 3/2012 | Kothari et al. |
| 8,144,699 B2 | 3/2012 | Vinneras |
| 8,166,205 B2 | 4/2012 | Farinacci et al. |
| 8,175,078 B2 | 5/2012 | Voit et al. |
| 8,184,526 B2 | 5/2012 | Duncan et al. |
| 8,861,533 B1 * | 10/2014 | Durrett .................. H04L 29/06 370/401 |
| 2005/0141504 A1 | 6/2005 | Rembert et al. |
| 2005/0198261 A1 | 9/2005 | Durvasula et al. |
| 2005/0220059 A1 | 10/2005 | DelRegno et al. |
| 2005/0220107 A1 | 10/2005 | DelRegno et al. |
| 2005/0220143 A1 | 10/2005 | DelRegno et al. |
| 2005/0220148 A1 | 10/2005 | DelRegno et al. |
| 2005/0226215 A1 | 10/2005 | DelRegno et al. |
| 2005/0238049 A1 | 10/2005 | Delregno |
| 2006/0133405 A1 | 6/2006 | Fee |
| 2006/0153070 A1 | 7/2006 | DelRegno et al. |
| 2006/0182113 A1 | 8/2006 | Liang et al. |
| 2006/0187950 A1 | 8/2006 | Bou-Diab et al. |
| 2008/0281980 A1 | 11/2008 | Del Regno et al. |
| 2008/0304476 A1 | 12/2008 | Pirbhai et al. |
| 2009/0080425 A1 | 3/2009 | Parker et al. |
| 2009/0103448 A1 | 4/2009 | Waggener et al. |
| 2009/0154453 A1 | 6/2009 | Shah et al. |
| 2009/0164626 A1 | 6/2009 | Roll et al. |
| 2010/0014531 A1 | 1/2010 | Pirbhai et al. |
| 2010/0040206 A1 | 2/2010 | DelRegno et al. |
| 2010/0085974 A1 | 4/2010 | Miyabe |
| 2011/0075560 A1 | 3/2011 | DelRegno et al. |
| 2011/0119740 A1 | 5/2011 | Grayson et al. |
| 2011/0292948 A1 | 12/2011 | Delregno |
| 2011/0299420 A1 | 12/2011 | Waggener et al. |
| 2012/0033971 A1 | 2/2012 | Fourcand |
| 2012/0036234 A1 | 2/2012 | Staats et al. |
| 2013/0003759 A1 | 1/2013 | Sergeev et al. |

OTHER PUBLICATIONS

DS1 Network Interface Unit with Performance Monitoring Model 3115-60 Issue B, Part of the Westell PROACT™ Family CLEI* Code: T1S1FJVAAA, Westell, Section 311-560-20B, Copyright 2009 Westell, Inc., pp. 1-27.

Provisioning Voice Over Packet Networks: A Metadata Driven, Service Object Based Approach, Jung Tjong et al., O. Festor and A. Pras (Eds.): 12$^{th}$ International Workshop on Distributed Systems, Operations and Management DSOM'2001, Nancy, France, Oct. 15-17, 2001, 12 pages.

Reducing the Cost of Wireless Backhauling Through Circuit Emulation, ALTERA®, Jan. 2008, ver. 1.0, 10 pages.

* cited by examiner

FUNCTIONAL LAYERING AND MAPPING ONTO ENCAPSULATION HEADERS
(FROM MEF 8 IMPLEMENTATION AGREEMENT FOR THE EMULATION OF PDH CIRCUITS OVER METRO ETHERNET NETWORKS FIGURE 6-1)

METHODS AND APPARATUSES FOR AUTOMATED TDM-ETHERNET PROVISIONING

BACKGROUND OF THE INVENTION

Field of the Invention

The present invention relates generally to provisioning Ethernet circuits to carry TDM payloads (e.g., DS1 or DS3).

Description of Related Art

Telcos and other larger carriers such as AT&T and Verizon have been reluctant to switch to Ethernet because set up or provisioning Ethernet lines to carry TDM payloads (e.g., DS1 or DS3) is complicated. Further, it is important that packet traffic collisions be avoided since the telcos and larger carriers are required to provide the same quality of service (QoS) for DS1s carried over Ethernet service as they do for DS1s carried over SONET, for example.

The ability to configure an Ethernet circuit to carry DS1 or DS3 TDM signals is known. In general, a standard TDM signal is "packetized" to be compatible with Ethernet. In addition to TDM payload, each packet contains overhead (e.g., "headers" and "footers") to designate the packet destination and source within an Ethernet network, and often includes information such as check sums to validate that bits have not been corrupted, as well as means to designate the priority of each packet and the order in which the packets should be reassembled. Such overhead assists with providing the afore-mentioned QoS.

While it is presently possible to send DS1 and DS3 TDM circuits over Ethernet, many technicians and engineers were trained on TDM technology such as SONET and are therefore unfamiliar with the intricacies necessary to support TDM over Ethernet. In addition, even technicians familiar with the necessary Ethernet provisioning are still faced with the many individual steps necessary to set up such a circuit.

SUMMARY OF THE INVENTION

Illustrative embodiments of the present invention overcome the afore-mentioned difficulties in configuring DS1 and DS3 TDM circuits for transmission over Ethernet by providing apparatuses and methods that automate TDM-to-Ethernet provisioning steps necessary to provision Ethernet to carry TDM payload (e.g., DS1 or DS3).

As explained below, apparatuses (e.g., units) and methods are provided in accordance with illustrative embodiments of the present invention to assist telcos and other service providers with Ethernet virtual circuit (EVC) set up. A telco need only set up both ends of a path with one of a pair of units with automated private addressing, and pick one unit as a remote terminal (RT) and the other unit as a central office (CO) to ensure they have different addresses. After a DS1 state is enabled on the unit, no other operator involvement or intervention is needed to set up a DS1 end to end connection with the other unit since the enable DS1 state triggers automated connection set up functions. It is to be understood that the RT and CO designations for the units are arbitrary, that the "Central Office" unit and "Remote Unit" unit need not be placed in or at a Central Office or in or at a Remote Terminal, and that other designations can be used such as "A" and "B", or "first" and "second," "source" and "destination," "near end" and "far end," for example, as long as the two units in a pairing can be differentiated.

A number of different aspects of the present invention are described herein in accordance with illustrative embodiments of the present invention.

1. For example, a method for operating an Ethernet network or Ethernet network system can: deploy a pair of Ethernet interface units comprising a first Ethernet interface unit and a second Ethernet interface; designate one of the first Ethernet interface unit and the second Ethernet interface unit as one of a "Central Office" unit and a "Remote Terminal" unit, the other one of the first Ethernet interface unit and the second Ethernet interface unit to be designated as the other one of the "Central Office" unit and the "Remote Terminal" unit to, to enable the "Central Office" unit to obtain of a set of "Central Office" configuration parameters and the "Remote Terminal" unit to obtain a set of "Remote Terminal" configuration parameters; and enable an Ethernet network state to trigger an Ethernet network connection between the first Ethernet interface unit and the second Ethernet interface unit according to the set of "Central Office" configuration parameters and the set of "Remote Terminal" configuration parameters.

2. The method for operating an Ethernet network or Ethernet network system according to aspect 1 can further include disabling the Ethernet network state to trigger an Ethernet network disconnection between the first Ethernet interface unit and the second Ethernet interface unit.

3. For the method for operating an Ethernet network or Ethernet network system according to aspect 1, the other one of the first Ethernet interface unit and the second Ethernet interface unit is designated as the other one of the "Central Office" unit and the "Remote Terminal" unit automatically.

4. For the method for operating an Ethernet network or Ethernet network system according to aspect 1, at least one of the set of "Central Office" configuration parameters and the set of "Remote Terminal" configuration parameters are obtained program code data or file data stored on a computer-readable memory.

5. For the method for operating an Ethernet network or Ethernet network system according to aspect 1, the set of "Central Office" unit acquires a "Central Office" IP address, and the "Remote Terminal" unit acquires a "Remote Terminal" IP address different from the "Central Office IP address.

6. For the method for operating an Ethernet network or Ethernet network system according to aspect 1, the set of "Central Office" configuration parameters comprises "Central Office" IP address configuration information and other "Central Office" configuration information, and the set of "Remote Terminal" configuration parameters comprises "Remote Terminal" IP address configuration information and other "Remote Terminal" IP address information.

7. For the method for operating an Ethernet network or Ethernet network system according to aspect 1, at least one of the other "Central Office" configuration information and the other "Remote Terminal" configuration information comprises at least two of: an IP address parameter; a TDM TX clock source parameter; a clock mode parameter; an adaptive or differential mode parameter; a Structure Aware or Structure Agnostic mode parameter; an emulated circuit to DS1 association parameter; an emulated circuit identifier parameter; a PSN type parameter; a clock recovery parameter; a differential time parameter; a max jitter buffer size parameter; a next hop type parameter; a packet payload size parameter; a TX ECID parameter; a RX ECID parameter; and an emulated circuit parameter.

The present invention may comprise a method or apparatus for operating an Ethernet network or Ethernet network system having one or more of the above aspects, and/or one or more of the features and combinations thereof. The present invention may comprise one or more of the features and/or combinations of the above aspects as recited, for example, in the attached claims.

BRIEF DESCRIPTION OF THE DRAWINGS

The invention will be more readily understood with reference to the illustrative embodiments thereof illustrated in the attached drawing figures, in which.

Throughout the drawing figures, like reference numbers will be understood to refer to like elements, features and structures.

DETAILED DESCRIPTION OF ILLUSTRATIVE EMBODIMENTS

Figure 1:
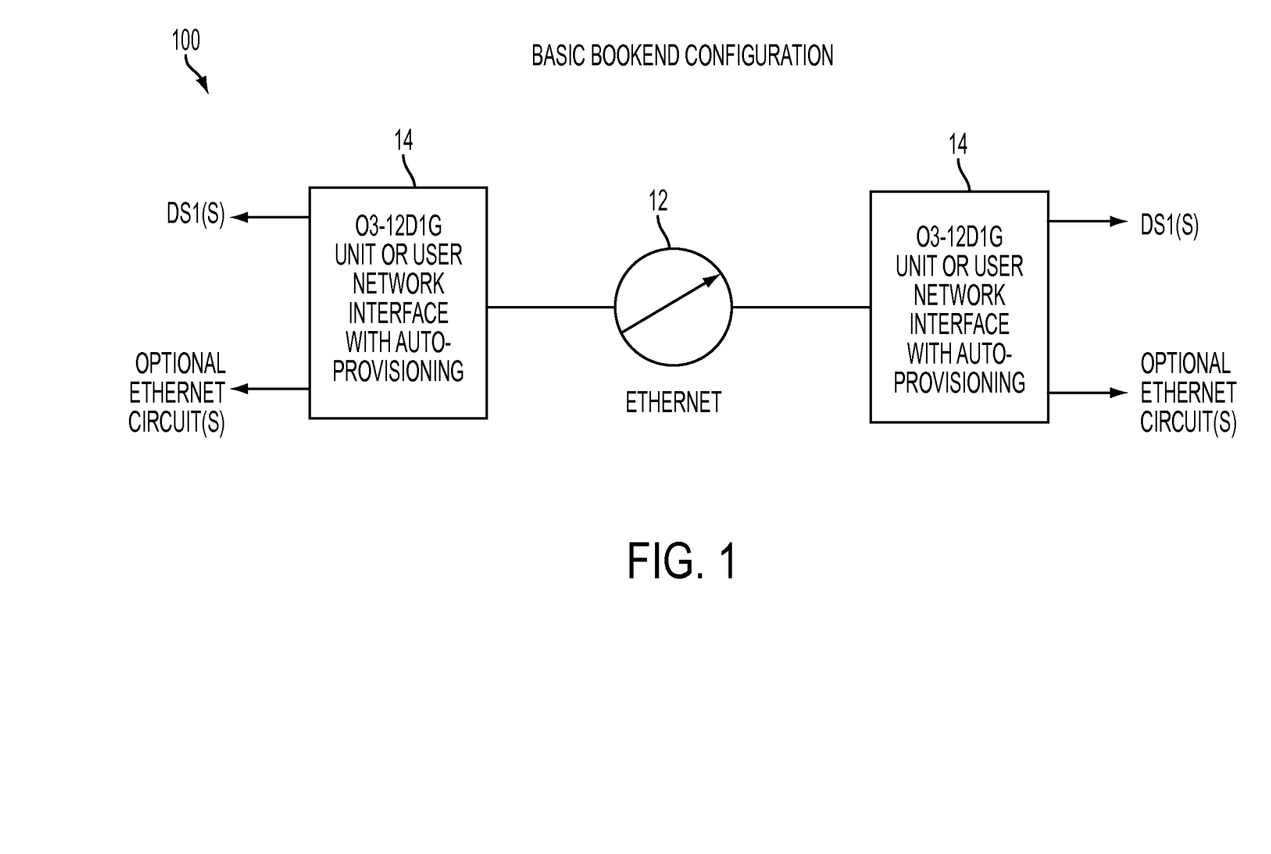
FIGS. 1 and 2 depict example networks in which TDM-to-Ethernet autoprovisioning modules 14 constructed in accordance with illustrative embodiments of the present invention can be utilized.
Figure 2:
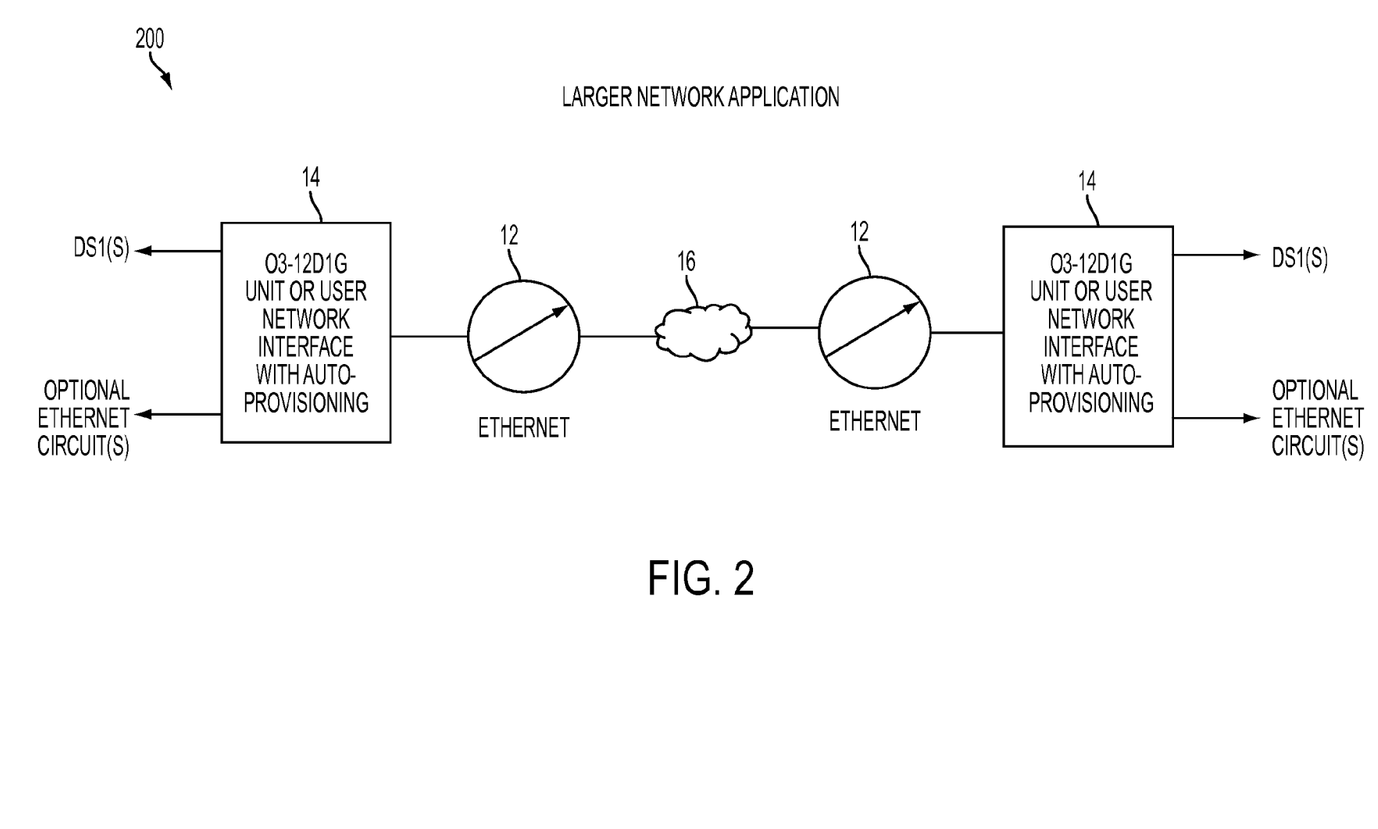

With reference to FIGS. 1 and 2, example networks are shown in which TDM-to-Ethernet autoprovisioning modules 14 that are constructed in accordance with illustrative embodiments of the present invention can be utilized. The afore-mentioned units 14 can be any network equipment (NE) or devices (e.g., a switch, access device, and so on) that interface with an Ethernet network and provide DS1(s) or other digital data channels at different digital signal rates (e.g., DS0(s), DS3(s) and so on) and optional Ethernet circuits to end users, and that are configured to perform TDM-to-Ethernet autoprovisioning in accordance with illustrative embodiments of the present invention. A unit 14 can be for example, a O3-12D1G commercially available from Pulse Communications Inc., Herndon, Va. that is configured to perform TDM-to-Ethernet autoprovisioning in accordance with the present invention. In accordance with another illustrative embodiment of the present invention, a TDM-to-Ethernet autoprovisioning module 14 can be deployed in existing NE. For example, the TDM-to-Ethernet autoprovisioning module 14 can be configured as program code and parameters stored on a computer-readable memory or otherwise provided to a processing device in a NE.

As stated above, FIGS. 1-2 illustrate example networks in which the TDM-to-Ethernet autoprovisioning module 14 can be utilized. For example, a pair of TDM-to-Ethernet autoprovisioning modules 14 can be connected to an Ethernet circuit in a basic bookend configuration application 100 as shown in FIG. 1. The autoprovisioning modules 14 can be connected also in a larger network application 200 (FIG. 2) that includes a cloud 16. In such networks, Ethernet Private Line service must be set up between the various O3-12D1G or similar devices 14 in a network to create "virtual bookend" connections for each set of point-to-point DS1 connections.

The TDM-to-Ethernet autoprovisioning module 14 eliminates all DS1 over Ethernet provisioning by a combination of pre-setting certain parameters and arranging communication between the CO and RT-designated units 14 to automatically provision other parameters. These automatic operations include but are not limited to:

1. Use Private Source and Destination IP Addresses for TDM over Ethernet Emulated Circuits based on CO versus RT selection
2. Create/save a set of Default Parameters based on CO vs RT selection
3. Create Emulated Circuits based on saved parameters
4. Enable/disable Emulated Circuits based on DS1 Service State The TDM-to-Ethernet autoprovisioning provided by the present invention is advantageous because users simply need to provision a pair of units equipped TDM-to-Ethernet autoprovisioning 14 in accordance with the present invention as either a "CO" unit 14 (i.e., nearest the network) or RT unit 14 (e.g., typically located at or near a subscriber). The units 14 then respond exactly as if they were TDM units. That is, each DS1 or DS3 is optioned in the TDM fashion as either in service or out of service, and the usual TDM parameters (e.g., SF, ESF or unframed operation) are set as historically done in TDM networks and as understood by technician and engineers trained on TDM circuits.

1. Use Private Source and Destination IP Addresses for TDM Over Ethernet Emulated Circuits Based on CO Versus RT Selection Since a pair of units 14 are provisioned to connect to each other via an Ethernet circuit(s), any pair of addresses can be assigned to respective ones of the units from a designated private range. In the illustrated embodiment of FIG. 6, private IP Addresses for an emulated circuit 12 are, for example, for the unit-type RT 14, IP=10.10.10.4, and for the unit-type CO 14, IP=10.10.10.5.

2. Default Parameters Based on CO Versus RT Selection

As stated above, one of the ways in which the TDM-to-Ethernet autoprovisioning module 14 eliminates all Ethernet provisioning for TDM payloads is by using pre-setting of certain parameters. Default TDM over Ethernet automatic provisioning parameters can include, but are not limited to:
   a) Private IP Addresses for Emulated Circuit (for example, RT=10.10.10.4, CO=10.10.10.5)
   b) TDM TX Clock Source
   c) Clock Mode
   d) Adaptive versus Differential Mode
   e) Structure Aware versus Agnostic
   f) Emulated Circuit to DS1 Association (50000 to DS1 #1, 50001 to DS1 #2, etc.)
   g) Emulated Circuit Identifier (aka Bundle Number) (50000 to 50011)
   h) PSN Type (IP—UDP/IP header)
   i) Clock Recovery
   j) Differential Time
   k) Max Jitter Buffer Size
   l) Next Hop Type (IP)
   m) Packet Payload size
   n) TX ECID (aka Bundle number) location in UDP (Source)
   o) RX ECID (aka Bundle number) location in UDP (Source)
   p) Emulated Circuit (aka Bundle) State (Existing/Disconnected per DS1)

Thus, the TDM-to-Ethernet autoprovisioning provided in accordance with the present invention eliminates a substantial number of individual parameters which must be set, tracked and managed when setting up TDM-over-Ethernet circuits in the conventional manner, thereby permitting faster, easier and far less complex operation. It is to be understood that various parameters other than those exemplified herein, and other parameter values and selections can be used, as long as they are pre-designated (e.g., set forth in a configuration file, or otherwise known or accessible to the units 14 at the time of DS1 set up).

Figure 3:
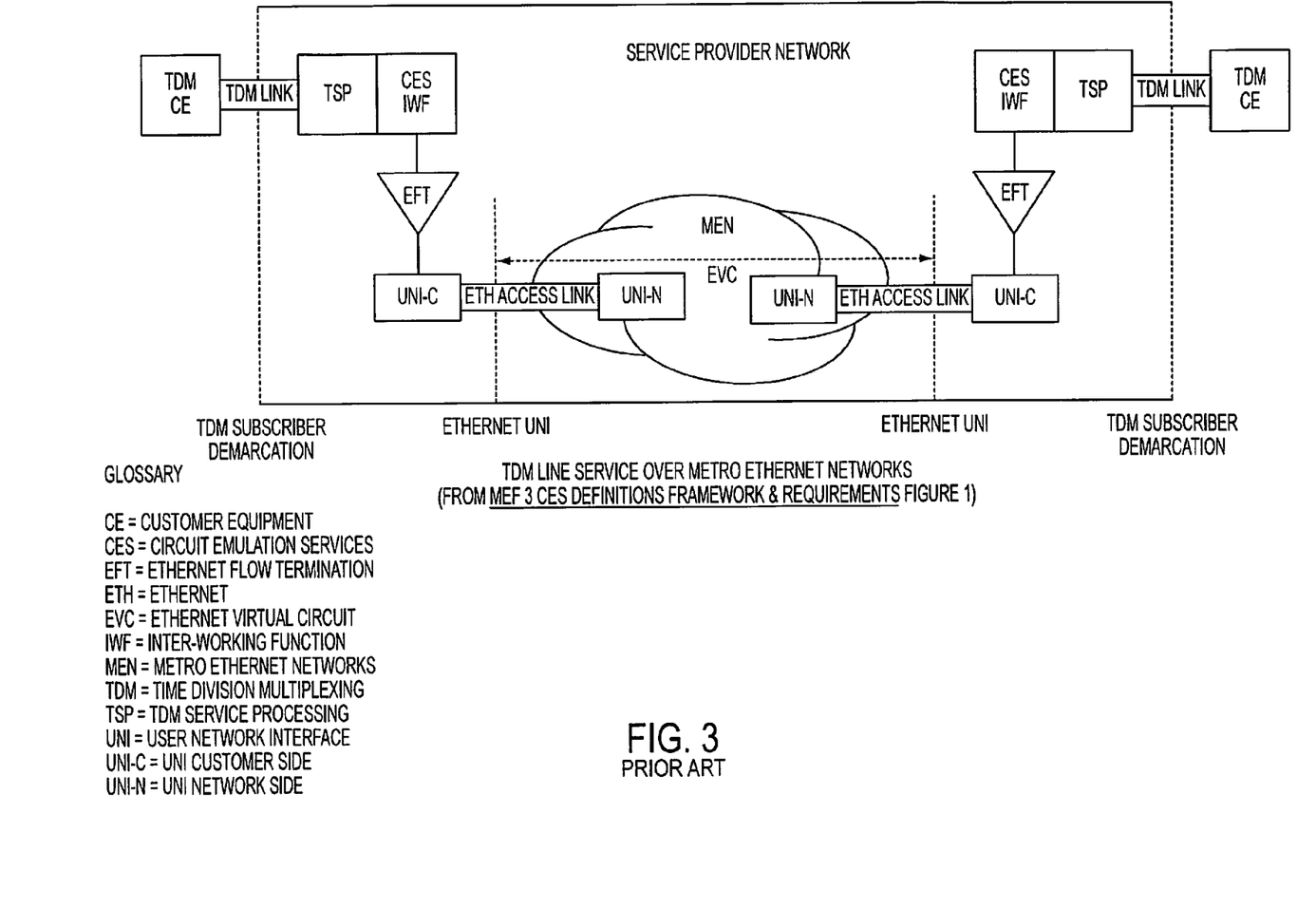
FIGS. 3 and 4 are Metro Ethernet Forum (MEF) technical specification diagrams depicting a service provider network and functional layering needed to support TDM service over Ethernet networks.
Figure 4:
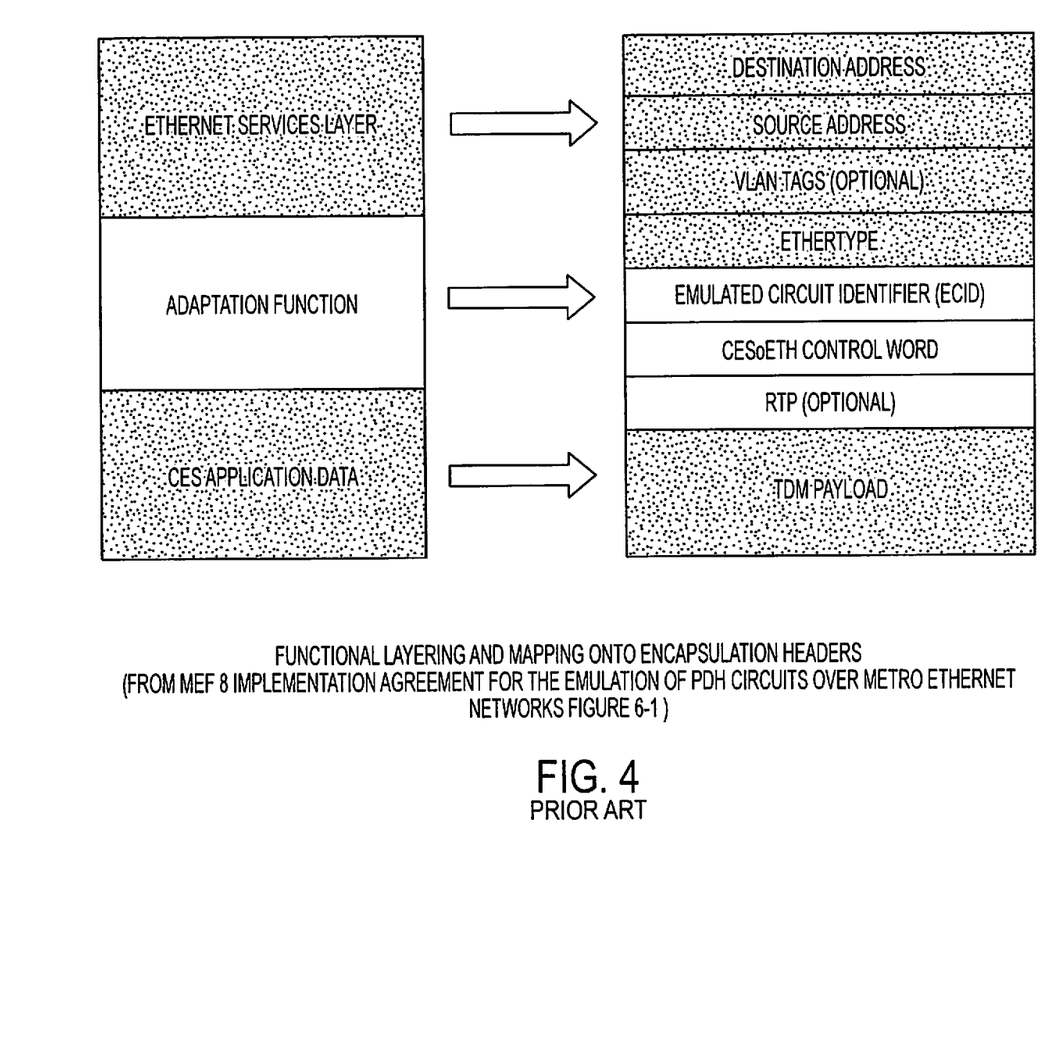

FIGS. 3 and 4 are Metro Ethernet Forum (MEF) technical specification diagrams which will now be used to illustrate key areas of issue or difficulty in traditionally setting up TDM-over-Ethernet circuits that are now addressed and overcome by TDM-to-Ethernet autoprovisioning in accordance with the present invention. FIGS. 3 and 4 are from the Metro Ethernet Forum tech specs document MEF 3 available at metroethernetforum.org. See MEF 3, The Metro Ethernet Forum, ©2004, 65 pages.

FIG. 3 illustrates a block diagram of a service provide network having a Metro Ethernet Networks (MEN). Telcos and providers are familiar with the setup of the TSP block which is essentially the DS1 provisioning. However, the CES IWF, EFT, and EVC including the Functional Layering need to also be set up, but are completely unfamiliar to most technicians and also very complicated. The Function Layering is illustrated, for example, in FIG. 4. TDM-to-Ethernet autoprovisioning in accordance with the present invention performs these set up operations automatically.

a) Private IP Addresses for Emulated Circuit (for example, RT=10.10.10.4, CO=10.10.10.5) are set based on the user's RT/CO selection. It is somewhat arbitrary and employed by the EFT block.
  b) TDM TX Clock Source—this is set up as the default for the TX clock source parameter, and is employed by the CES IWF block.
  c) Clock Mode—this parameter is set to separate RX and TX clocks and is employed by the CES IWF block.
  d) Adaptive versus Differential Mode—this parameter setting allows the far end unit's receiver (RX) to be slave to the near end's transceiver (TX) clock, and is employed by the CES IWF block.
  e) Structure Aware versus Agnostic—this parameter setting allows any type of DS1 format to pass, and is employed by the CES IWF block.
  f) Emulated Circuit to DS1 Association (e.g., 50000 to DS1 #1, 50001 to DS1 #2, etc.)—this association can be set in a somewhat arbitrary manner, mapping each DS1 sequentially to the ECID (bundle number), for example. This association occurs when the user enables a DS1 circuit, and is employed by the EFT block.
  g) Emulated Circuit Identifier (aka Bundle Number) (e.g., 50000 to 50011)—this parameter is set per DS1 in the range of undefined UDP values, the range also being somewhat arbitrary. This parameter is employed by the CES IWF block and identifies the Ethernet flow responsible for a particular DS1.
  h) PSN Type—this parameter can be UDP/IP, MEF, MPLS or L2TPV3, for example, and is selected to match the end user network. For example, IP-USP-IP header can be selected as it can fit well with other parameters employed to use ARP to find the far end MAC address.
  i) Clock Recovery—this parameter is set to make each of the DS1s derive their clock from their respective recovered packet stream, and is employed by the CES IWF block.
  j) Differential Time—this parameter is selected to be optimized for best clock recovery, and is employed by the CES IWF block.
  k) Max Jitter Buffer Size—this parameter is selected to be optimized for best clock recovery, and is employed by the CES IWF block.
  l) Next Hop Type (IP)—this parameter is set for IP to enable ARP (i.e., the protocol that finds the far end MAC), and is employed by the EFT block.
  m) Packet Payload size—this parameter is selected to be optimized for best clock recovery, and is employed by the CES IWF and EFT blocks.
  n) TX ECID (aka Bundle number) location in UDP (Source)—this parameter establishes which UDP field (e.g., source versus destination) contains the ECID (Bundle number). It is somewhat arbitrary, and is employed by the EFT block.
  o) RX ECID (aka Bundle number) location in UDP (Source)—this parameter establishes which UDP field (source versus destination) contains the ECID (Bundle number). It is somewhat arbitrary, and is employed by the EFT block.
  p) Emulated Circuit (aka Bundle) State (Existing/Disconnected per DS1)—this parameter is set when the user enables or disables a DS1. Ordinarily, it would require an additional step to the DS1 enable/disable. It turns on the IWF and EFT blocks when the TSP block is set for DS1 enabled.

In addition, defaults are set in the switch section (UNI-C/ETH Access Link/UNI-N), which can reside, for example, within an O3-12D1G. These default parameters are:

Ethernet link rate—set to be more than sufficient for 12 DS1 circuits with payload of 24 bytes; and
  EVC—established to transport TDM pseudowire (PW), insulating the private IP address and all the DS1 traffic from 'other' Ethernet traffic in the MEN.

With continued reference to FIG. 4, the Function Layering is set as follows with TDM-to-Ethernet autoprovisioning in accordance with the present invention.

Destination Address—the Ethernet standard protocol ARP (Address Resolution Protocol) is used and combined with the preset IP addresses (based on RT/CO) to determine the Destination's MAC address
  Source Address—this is 'hard-wired' into the unit as it is in any IEEE802.3 compliant Ethernet MAC device.
  VLAN Tags—the unit 14 opts out at the CES layer because an EVC is set up (which does the same function using VLAN Tags) at the network side. This is part of the default switch setup in which a VLAN selected as the EVC.
  Ethertype—this is simply the CES ethertype defined by MEF-8.
  ECID—the UDP port number is used for the ECID. A somewhat arbitrary choice that goes well with the ARP mechanism.
  CESoETH Control Word—contains structure parameter; unstructured—SAToP format is designated as default.
  RTP—the unit 14 is configured not to use RTP.
  TDM Payload—a 24 byte payload is used to minimize packet size, maximizing packet repetition and therefore minimizing jitter.

These settings and parameters are stored in two separate configuration files for an RT unit setting and a CO unit setting, respectively. Alternatively, parameters common to both the RT unit setting and a CO unit setting can be provided as one file to each of the units 14 in a unit pair, with RT and CO-specific parameters being provided as separate files or data elements. Other data and/or file structures are envisioned.

3. Create Emulated Circuits Based on Saved Parameters; and
4. Enable/Disable Emulated Circuits Based on DS1 Service State Reference is now made to FIGS. 5 and 6, which illustrate paired unit 14 operations in FIG. 5 and corresponding technician or user operations in FIG. 6. Each DS1 has a DS1 TDM configuration and a connection configuration associated with it. The parameters for these configurations are described above. The association between a DS1 TDM and its connection is assigned within these configurations and is used for automatic setup of the connection 12.

In accordance with advantageous aspects of illustrative embodiments of the present invention, the state of the connection 12 is directly associated with the state of the DS1. For example, an "Enable the DS1" operation 30 will trigger the automated connection set up between the two units 14 in the pairing 600 illustrated in FIG. 5. In order for the connection 12 to be set up, two units 14 have to have different IP addresses, which is achieved by designating one unit 14 to be CO and the other unit to be RT, as indicated at blocks 702 and 704 in FIG. 6. The units 14 can be default as RT (Remote), such that one unit has to be changed to CO as indicated at 18. At power up, the units 14 will read their corresponding configuration files (i.e., for CO or RT setting), and set up DS1 TDM and its connection.

By default, the DS1 state is disabled. Accordingly, the Enable DS1 state 30 will trigger setting up of DS1 end to end connection as indicated at 20 in FIG. 5 and at 706 in FIG. 6. It is done through ARP Request/Response protocol. ARP Request is sent out to the network to get the MAC address of the remote end through ARP Response received. If the remote end of the connection 12 is found, the DS1 between the two units 14 enter data transfer mode. If the remote unit is not found, the local unit will send out ARP Request periodically to query for the other unit status.

Figure 5:
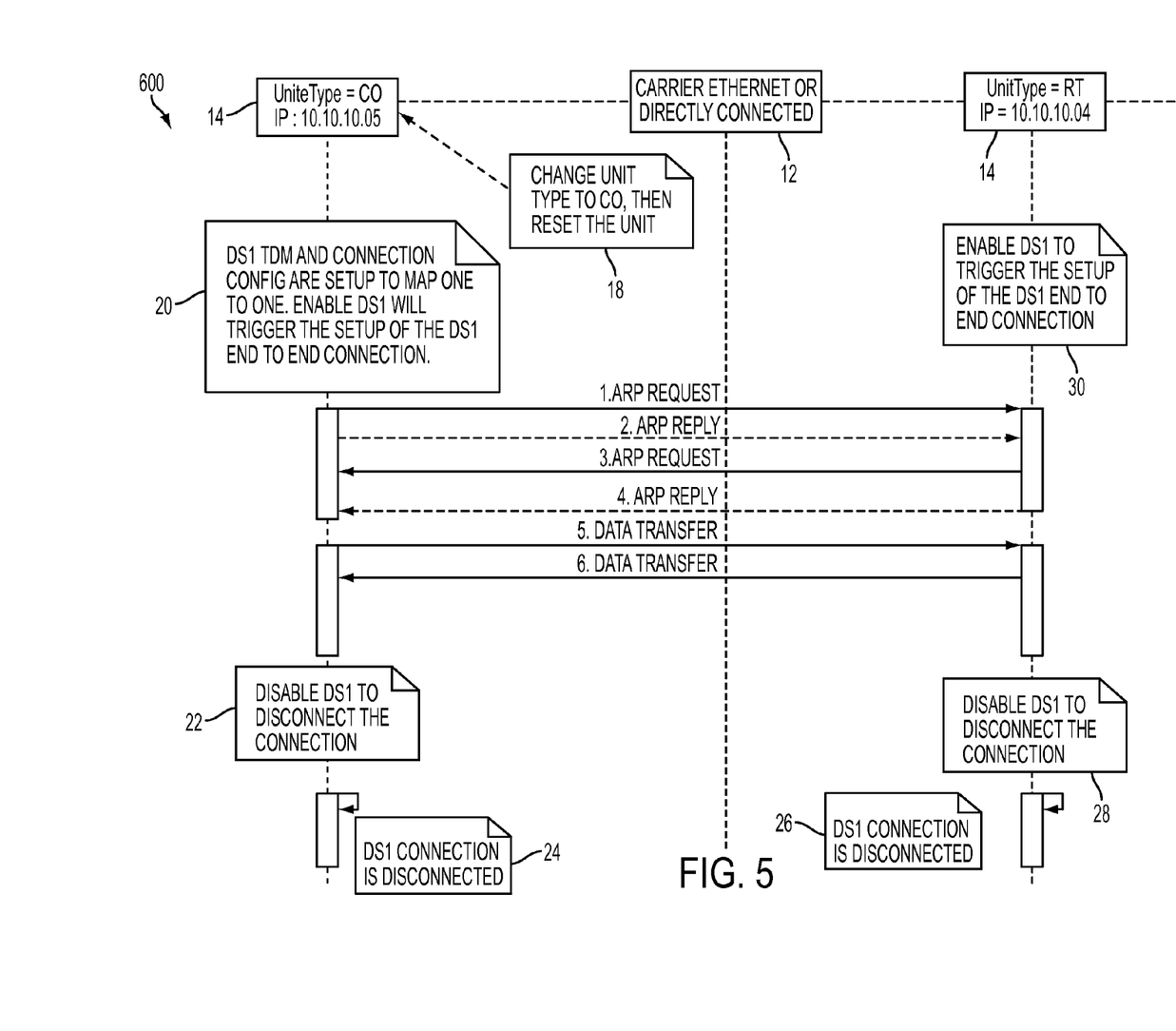
FIG. 5 is a flow chart showing operations between paired TDM-to-Ethernet autoprovisioning modules 14 constructed in accordance with an illustrative embodiment of the present invention.
Figure 6:
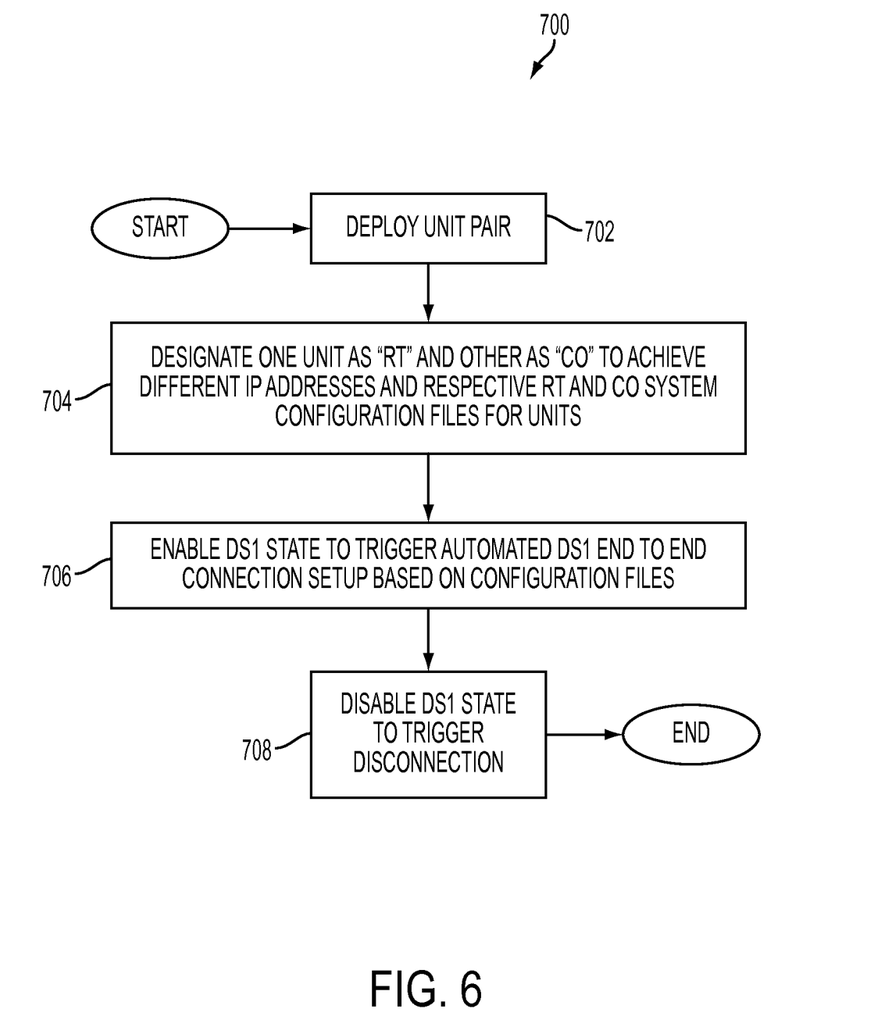
FIG. 6 is a flow chart showing user operations to set up TDM-to-Ethernet autoprovisioning modules 14 constructed in accordance with an illustrative embodiment of the present invention.

At any point that DS1 state is disabled, the connection will be disconnected, as indicated at 22, 24 and 28, 26 in FIG. 5 and at 708 in FIG. 6.

Thus, the TDM-to-Ethernet autoprovisioning in accordance with the present invention provisions Ethernet circuits to carry TDM payloads (e.g., DS1 or DS3). Telcos therefore find EVC set up to be much simpler since their technicians need only set up both end units 14 by picking one as RT and the other as CO and enabling the DS1 state. No other operator involvement or intervention is required for set up, eliminating the need for management software, QoS parameter set up, access profile databases and other operations and devices that have traditionally used in an attempt to facilitate TDM-to-Ethernet provisioning.

The above examples are described with reference to a DS1 TDM payload. It is to be understood that the present invention can be implemented to automatically perform TDM-to-Ethernet provisioning using other types of TDM payloads such as, but not limited to, DS0, DS3 and other digital signaling levels, and T1, T3, E1, E3 and other types of circuit channels.

Illustrative embodiments of the present invention can be implemented, at least in part, in digital electronic circuitry, analog electronic circuitry, or in computer hardware, firmware, software, or in combinations of them. The components of the TDM-to-Ethernet autoprovisioning 14 can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Illustrative embodiments of the present invention have been described with reference to a unit with TDM-to-Ethernet autoprovisioning module 14. It is to be understood, however, that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

Also, functional programs, codes, and code segments for accomplishing the present invention can be easily construed as within the scope of the invention by programmers skilled in the art to which the present invention pertains.

Method steps, processes or operations associated with an autoprovisioning module 14 can be performed by one or more programmable processors executing a computer program to perform functions of the invention by operating on input data and generating an output. Method steps can also be performed by, and an apparatus according to illustrative embodiments of the present invention, can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The above-presented description and figures are intended by way of example only and are not intended to limit the present invention in any way except as set forth in the following claims. It is particularly noted that persons skilled in the art can readily combine the various technical aspects of the various elements of the various exemplary embodiments that have been described above in numerous other ways, all of which are considered to be within the scope of the invention.

While the invention herein disclosed has been described by means of specific embodiments and applications thereof, numerous modifications and variations can be made thereto by those skilled in the art without departing from the scope of the invention.

What is claimed is:

1. A method of operating an Ethernet network, comprising:
deploying a pair of Ethernet interface units comprising a first Ethernet interface unit and a second Ethernet interface;
designating one of the first Ethernet interface unit and the second Ethernet interface unit as one of a "Central Office" unit and a "Remote Terminal" unit, the other one of the first Ethernet interface unit and the second Ethernet interface unit to be designated as the other one of the "Central Office" unit and the "Remote Terminal" unit, to enable the "Central Office" unit to obtain of a set of "Central Office" configuration parameters and the "Remote Terminal" unit to obtain a set of "Remote Terminal" configuration parameters; and
enabling a digital signal level n (DSn) service state to trigger an Ethernet network connection between the first Ethernet interface unit and the second Ethernet interface unit according to the set of "Central Office" configuration parameters and the set of "Remote Terminal" configuration parameters to set up a time division multiplex (TDM)-over-Ethernet circuit whereby the Ethernet network connection can transport TDM signals over Ethernet;
wherein the DSn service state can be disabled to trigger an Ethernet network disconnection between the first Ethernet interface unit and the second Ethernet interface unit.

2. The method of operating an Ethernet network of claim 1, wherein the other one of the first Ethernet interface unit and the second Ethernet interface unit is designated as the other one of the "Central Office" unit and the "Remote Terminal" unit automatically.

3. The method of operating an Ethernet network of claim 1, wherein at least one of the set of "Central Office" configuration parameters and the set of "Remote Terminal" configuration parameters are obtained from program code data or file data stored on a computer-readable memory.

4. The method of operating an Ethernet network of claim 1, wherein the set of "Central Office" unit acquires a "Central Office" IP address, and wherein the "Remote Terminal" unit acquires a "Remote Terminal" IP address different from the "Central Office IP address.

5. The method of operating an Ethernet network of claim 1,
wherein the set of "Central Office" configuration parameters comprises "Central Office" IP address configuration information and other "Central Office" configuration information, and
wherein the set of "Remote Terminal" configuration parameters comprises "Remote Terminal" IP address configuration information and other "Remote Terminal" IP address information.

6. The method of operating an Ethernet network of claim 5, wherein at least one of the other "Central Office" configuration information and the other "Remote Terminal" configuration information comprises at least two of:
an IP address parameter;
a TDM TX clock source parameter;
a clock mode parameter;
an adaptive or differential mode parameter;
a Structure Aware or Structure Agnostic mode parameter;
an emulated circuit to DS1 association parameter;
an emulated circuit identifier parameter;
a PSN type parameter;
a clock recovery parameter;
a differential time parameter;
a max jitter buffer size parameter;
a next hop type parameter;
a packet payload size parameter;
a TX ECID parameter;
a RX ECID parameter; and
an emulated circuit parameter.

7. An Ethernet network system comprising a pair of Ethernet interface units comprising a first Ethernet interface unit and a second Ethernet interface,
wherein the first Ethernet interface unit and the second Ethernet interface unit is adapted to be designated as one of a "Central Office" unit and a "Remote Terminal" unit,
wherein the other one of the first Ethernet interface unit and the second Ethernet interface unit is adapted to be designated as the other one of the "Central Office" unit and the "Remote Terminal" unit,
wherein each of the first Ethernet interface unit and the second Ethernet interface unit is adapted to obtain of a set of "Central Office" configuration parameters if it is designated as the "Central Office" unit and to obtain a set of "Remote Terminal" configuration parameters if it is designated as the "Remote Terminal" unit;
wherein the first Ethernet interface unit and the second Ethernet interface unit are adapted to establish an Ethernet network connection between the first Ethernet interface unit and the second Ethernet interface unit according to the set of "Central Office" configuration parameters and the set of "Remote Terminal" configuration parameters to set up a time division multiplex (TDM)-over-Ethernet circuit whereby the Ethernet network connection can transport TDM signals over Ethernet;
wherein the first Ethernet interface unit and the second Ethernet interface unit are adapted to establish the Ethernet network connection between the first Ethernet interface unit and the second Ethernet interface unit if a digital signal level n (DSn) service state is enabled; and
wherein the first Ethernet interface unit and the second Ethernet interface unit are adapted to disconnect if the DSn service state is disabled.

8. The Ethernet network system of claim 7, wherein the other one of the first Ethernet interface unit and the second Ethernet interface unit is designated as the other one of the "Central Office" unit and the "Remote Terminal" unit automatically.

9. The Ethernet network system of claim 7, wherein at least one of the set of "Central Office" configuration parameters and the set of "Remote Terminal" configuration parameters are obtained from program code data or file data stored on a computer-readable memory.

10. The Ethernet network system of claim 7, wherein the set of "Central Office" unit acquires a "Central Office" IP address, and wherein the "Remote Terminal" unit acquires a "Remote Terminal" IP address different from the "Central Office IP address.

11. The Ethernet network system of claim 7,
wherein the set of "Central Office" configuration parameters comprises "Central Office" IP address configuration information and other "Central Office" configuration information, and
wherein the set of "Remote Terminal" configuration parameters comprises "Remote Terminal" IP address configuration information and other "Remote Terminal" IP address information.

12. The Ethernet network system of claim 11, wherein at least one of the other "Central Office" configuration information and the other "Remote Terminal" configuration information comprises at least two of:
  an IP address parameter,
  a TDM TX clock source parameter;
  a clock mode parameter;
  an adaptive or differential mode parameter;
  a Structure Aware or Structure Agnostic mode parameter;
  an emulated circuit to T1 association parameter;
  an emulated circuit identifier parameter;
  a PSN type parameter;
  a clock recovery parameter;
  a differential time parameter;
  a max jitter buffer size parameter;
  a next hop type parameter;
  a packet payload size parameter;
  a TX ECID parameter;
  a RX ECID parameter; and
  an emulated circuit parameter.

* * * * *